United States Patent
Bishop

(10) Patent No.: US 9,502,723 B2
(45) Date of Patent: Nov. 22, 2016

(54) METHOD OF OPERATING A FUEL CELL IN CONFINED SPACE

(71) Applicant: HAMILTON SUNDSTRAND CORPORATION, Charlotte, NC (US)

(72) Inventor: Benjamin Elmer Bishop, South Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 318 days.

(21) Appl. No.: 14/173,238

(22) Filed: Feb. 5, 2014

(65) Prior Publication Data

US 2015/0147664 A1  May 28, 2015

Related U.S. Application Data

(60) Provisional application No. 61/907,428, filed on Nov. 22, 2013.

(51) Int. Cl.
*H01M 8/04* (2016.01)
*H01M 8/06* (2016.01)

(52) U.S. Cl.
CPC ..... *H01M 8/04171* (2013.01); *H01M 8/04007* (2013.01); *H01M 2250/20* (2013.01); *Y02E 60/50* (2013.01); *Y02T 90/32* (2013.01)

(58) Field of Classification Search
CPC ............ H01M 8/04007; H01M 8/04156; H01M 8/04171
USPC ....................................................... 429/414
See application file for complete search history.

(56) References Cited

U.S. PATENT DOCUMENTS

| | | | |
|---|---|---|---|
| 4,040,435 A * | 8/1977 | Elzinga | H01M 8/04082 429/434 |
| 4,839,107 A | 6/1989 | Rudick et al. | |
| 4,855,192 A * | 8/1989 | Grasso | H01M 8/04029 429/437 |
| 4,882,097 A | 11/1989 | Shannon | |
| 5,047,298 A | 9/1991 | Perry, Jr. et al. | |
| 5,417,146 A | 5/1995 | Zimmer et al. | |
| 6,575,248 B2 | 6/2003 | Zhang et al. | |
| 7,323,262 B2 | 1/2008 | Simpson et al. | |
| 7,604,791 B2 | 10/2009 | Sato et al. | |
| 8,268,508 B2 | 9/2012 | Noh et al. | |
| 2002/0025457 A1 | 2/2002 | Dodd | |
| 2009/0017349 A1 | 1/2009 | Kohda | |
| 2010/0028734 A1* | 2/2010 | Ballantine | H01M 8/04223 429/413 |
| 2010/0055517 A1* | 3/2010 | Uzhinsky | C01B 3/065 429/495 |

OTHER PUBLICATIONS

Irving, Patricia M. and Jeffrey Pickles. Low Oxygen Fuel Cell Power System for Undersea Vehicles. Electro-Chem 2007.

* cited by examiner

*Primary Examiner* — Sean P Cullen
(74) *Attorney, Agent, or Firm* — Carlson, Gaskey & Olds, PC

(57) ABSTRACT

A method of operating a fuel cell in a vehicle includes the steps of initially charging a waste tank with a gas that is readily absorbable in water. A supply of fuel is passed across one electrode in a fuel cell, and a supply of oxygen containing gas across another electrode generating water from operation of the fuel cell. The water is delivered into the tank. A vehicle is also disclosed.

12 Claims, 1 Drawing Sheet

METHOD OF OPERATING A FUEL CELL IN CONFINED SPACE

RELATED APPLICATION

This application claims priority to U.S. Provisional Application No. 61/907,428, filed Nov. 22, 2013.

BACKGROUND OF THE INVENTION

This application relates to storage of waste water from a fuel cell operating in a confined space.

Fuel cells have been proposed to power vehicles which must operate as a closed system for a period of time. As an example, underwater vehicles are proposed which are powered by fuel cell systems. In general, there must be no waste emissions from the vehicle and, thus, all required fluids and all waste must be stored on the vehicle.

In an oxygen/hydrogen fuel cell system, water is a waste product. The water is typically stored in a tank in the vehicle.

In the prior art, the tank may have contained air and when water was delivered into the tank, the air became compressed. Not all the volume of the tank could store water, increasing the volume of the system for a given level of capability. This is undesirable.

SUMMARY OF THE INVENTION

A method of operating a fuel cell in a vehicle includes the steps of initially charging a waste tank with a gas that is readily absorbable in water. A supply of fuel is passed across one electrode in a fuel cell, and a supply of oxygen containing gas across another electrode generating water from operation of the fuel cell. The water is delivered into the tank.

These and other features may be best understood from the following drawings and specification.

DETAILED DESCRIPTION

Figure 1A:
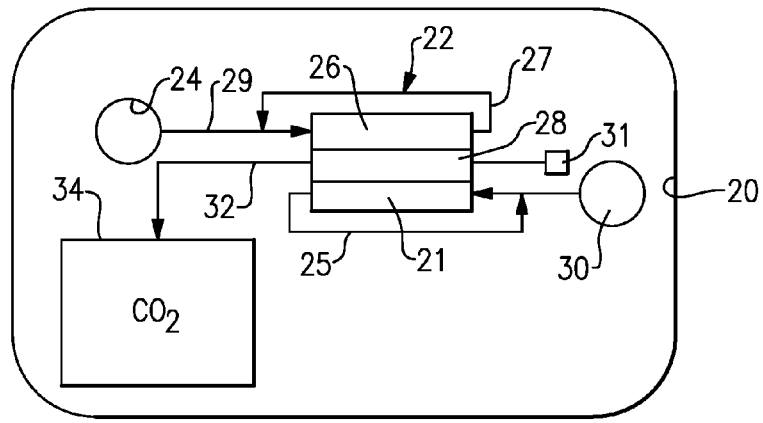
FIG. 1A schematically shows a vehicle.

A vehicle 20 is illustrated schematically in FIG. 1. Vehicle 20 may be an underwater vehicle such as may be operated in an unmanned condition for a period of time.

As mentioned above, it is desirable that no waste fluids leave the vehicle 20. Systems on the vehicle are powered by fuel cells shown schematically at 22. While a single fuel cell is illustrated, it should be understood that the actual vehicle 20 could include an array of fuel cells. As known, a fuel cell typically includes two electrodes, shown here as an anode 26 and a cathode 21.

As known, a typical fuel cell 22 includes anode 26 that receives a fuel supply, typically hydrogen, from a supply line 29 connected to fuel tank 24. The fuel is driven across the anode 26. Downstream of the anode 26, the fuel returns through line 27 to supply line 29. A membrane 28 separates cathode 21 from anode 26. A supply tank 30 of an oxygen containing gas is driven across the cathode 21 and is returned at 25 to the supply line. The oxygen containing gas may be air in many applications.

The fuel cell 22 generates electricity for uses such as shown schematically at 31. The uses may be systems to power the vehicle 20, sensors for sensing the environment of the vehicle 20, etc.

Figure 1B:
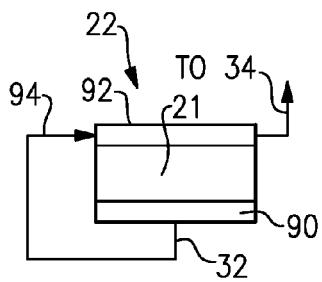
FIG. 1B shows a detail of a fuel cell system.

As known, water is a waste product of such a fuel cell 22. Water line 32 is shown being directed into tank 34. FIG. 1A is a schematic view of the system. As shown in FIG. 1B, it is known to provide a wick layer 90 associated with cathode 21 to wick the water to the line 32. Further, as shown at 94, this water may be returned to cooling passages 92 associated with the fuel cell 22, prior to the water being delivered to the tank 34.

The waste water in line 32 is driven into a tank 34. The tank 34 is initially charge with a gas which is absorbed in water. One such gas is carbon dioxide. Any other gas which may be inert in water, and readily absorbed in water, may be utilized.

Figure 2:
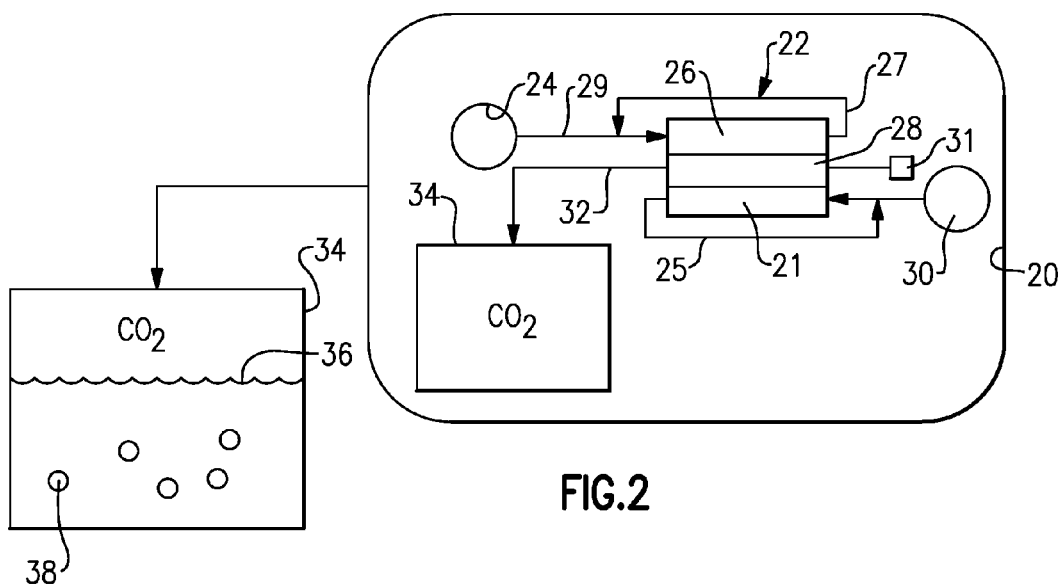
FIG. 2 shows the vehicle after operating for a period of time.

FIG. 2 shows the tank 34 after operation for a period of time. The $CO_2$ is no longer entirely filling the tank 34, but, instead, there is a volume of water 36 in the tank in addition to the remaining charge of $CO_2$. The tank volume can be fully occupied by water, with no void volume of gas, thereby utilizing all the tank volume for waste water. Alternatively, if the gas in the tank were allowed to vent into the enclosed space of the system, the static pressure of the gas in the enclosed system would be raised, typically to a very undesirable level.

As shown at 38, carbon dioxide has also been absorbed into the water.

The system may be able to operate for much longer periods of time than the prior art which pre-filled the tank with air. In embodiments, the tank 34 may be charged with one atmosphere of carbon dioxide, and the tank would then be capable of being completely filled with water, with all the $CO2$ being adsorbed into the water without venting gas to the enclosed volume.

The vehicle 20 is operated in an environment where it is undesirable to discharge either gas or product water from the bank. As mentioned, the environment may be underwater.

Figure 3:
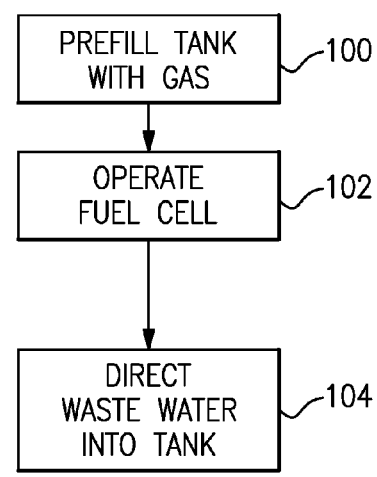
FIG. 3 is a flow chart of the inventive method.

FIG. 3 shows a flow chart for the method of this application. At step 100, a tank is pre-filled with a gas, which may be carbon dioxide. At step 102, the fuel cell is then operated. Wastewater is directed into the tank at step 104.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of operating a fuel cell in a vehicle comprising the steps of:
   initially charging a waste tank with a gas other than air, and that is absorbable and inert in water;
   passing a supply of fuel across one electrode in the fuel cell, and a supply of oxygen containing gas across another electrode generating water from operation of the fuel cell; and
   then delivering the water into the waste tank.

2. The method as set forth in claim 1, wherein the vehicle is an underwater vehicle.

3. The method as set forth in claim 1,
   wherein said water is passed across the fuel cell for cooling prior to being delivered into said waste tank.

4. The method as set forth in claim 3, wherein said water is wicked away from one of said electrodes.

5. The method as set forth in claim 1, wherein said gas is carbon dioxide.

6. The method as set forth in claim 5, wherein said waste tank is initially charged with one atmosphere of carbon dioxide.

7. The method as set forth in claim 5, wherein said fuel is hydrogen.

8. The method as set forth in claim 7, wherein said oxygen containing gas is air.

9. The method as set forth in claim 8, wherein said waste tank is initially charged with one atmosphere of carbon dioxide.

10. The method as set forth in claim 8, wherein the fuel cell is operated within an enclosed space on the vehicle.

11. The method as set forth in claim 5, wherein said water is passed across the fuel cell for cooling prior to being delivered into said waste tank.

12. The method as set forth in claim 11, wherein said water is wicked away from one of said electrodes.

\* \* \* \* \*